Patented Aug. 3, 1954

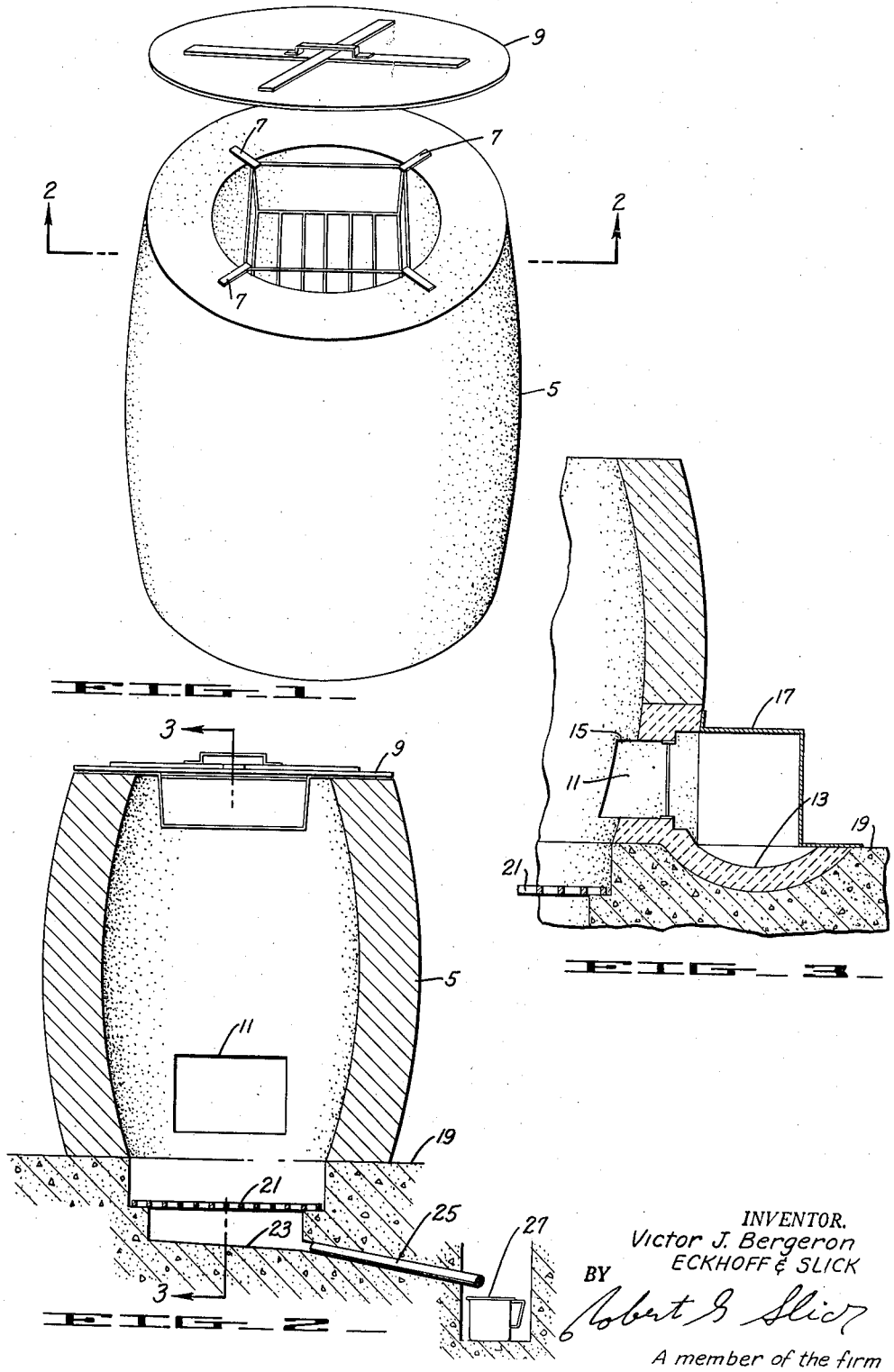

2,685,285

UNITED STATES PATENT OFFICE 2,685,285

BARBECUE DEVICE

Victor J. Bergeron, Lafayette, Calif.

Application February 28, 1952, Serial No. 273,897

1 Claim. (Cl. 126—25)

This invention relates to an improved barbecue device and particularly to a barbecue device in which the fire hazard is greatly reduced, if it is not eliminated.

Barrel-shaped barbecue devices have been used by the Chinese for hundreds of years and have recently come into use in this country. In such a barbecue device, there is provided a barrel-like oven of brick or other suitable refractory material with provisions for a fire outside of the oven near the bottom and for hanging meat or other food to be cooked inside the oven near the top, the hot products of combustion sweeping up through the oven. Such devices suffer from the defect that grease drips from the meat and accumulates in the bottom of the barbecue, and if a hot spark is drawn into the oven, it may fall in the pool of grease, setting the grease and food on fire. Therefore, such ovens have been looked upon with disfavor in the past due to their high fire hazard.

It has been suggested that such ovens might be made with a sloping bottom with means for draining the grease into a suitable receptacle. However, even with such a provision for draining the grease, a considerable amount of grease will accumulate on the floor of the oven and may give rise to a fire.

It is the object of the present invention to provide a barbecue oven of generally improved structure.

It is a further object of this invention to provide a barbecue oven having a negligible fire hazard.

In general, the objects of the present invention are achieved by providing an open grill work raised above the floor of the barbecue oven but beneath the point of entry of the fire, whereby any sparks which may be drawn into the oven will drop harmlessly onto the grill rather than falling to the floor of the oven. As a further precaution, the barbecue oven may be provided with a sloping floor whereby the grease may be drained into a suitable receptacle.

In the drawings:

Figure 1 is a perspective view of my improved barbecue.

Figure 2 is a cross section of my improved barbecue on the lines 2—2 of Figure 1.

Figure 3 is a partial cross-sectional view of my improved barbecue on the line 3—3 of Figure 2.

Referring now to the drawings by reference characters, there is shown a barrel-like oven generally indicated at 5, which may be of brick, cement, or other suitable refractory material capable of withstanding heat. Preferably, the walls are relatively thick, as shown, to provide insulation and a storage of heat. Suspended in the top of the barrel-like oven is a grill 7 which may be of any suitable design for holding the food articles to be barbecued. The oven is further provided with a lid 9 which may be placed over the barbecue in order that a large quantity of the smoke from the fire will be retained and give the meat cooked therein a good flavor.

Near the bottom, at one side of the oven, there is a rectangular opening 11 for the introduction of products of combustion from the fuel burning in fire pit 13. Preferably, the aperture is provided with a hood 15 which extends for a short distance into the interior of the barbecue. The fire pit 13 may also be equipped with a hood 17 to divert most of the heat and smoke from the fire into the barbecue; this prevents smudging the the outside of the oven, or the waste of fuel.

The barbecue oven is ordinarily installed so that only the portion 5 extends above the floor level 19, leaving a portion of the barbecue beneath the floor level. Mounted beneath the floor level and a short distance beneath the aperture 11 is a perforated metal plate 21. This may be in the form of an ordinary screen or may be made of a flat sheet of metal with suitable holes punched or bored therein. Beneath the plate 21 is the floor of the barbecue 23, which has a slight slope, as shown, the low portion of the floor 23 leading to a pipe or tube 25, which conveys grease which drains from the floor into a suitable receptacle 27.

In use, a fire is ordinarily built in the fire pit 13 and allowed to burn for an interval with the lid 9 of the barbecue removed. After the oven has become thoroughly heated, the meat or other food to be barbecued is placed on the rack 7 or is hung therefrom and the lid 9 placed on top of the barbecue. From time to time, sparks will be drawn from the fire pit 13 into the barbecue oven proper, but will drop harmlessly on the plate 21 and will be prevented from falling to the floor of the barbecue 23 and thus causing a fire. Although a small amount of grease will stick to the plate 21, this is insignificant and any fire on the plate itself will be so trivial as to cause no difficulty.

From the foregoing, it will be apparent that I have described a barbecue of generally improved design and one which is completely safe from the fire hazard standpoint.

I claim:

An improved barbecue device comprising an oven of barrel-like construction, a sloping floor in said oven adapted to collect grease and to drain it to one side, a metal grid suspended a short distance above said floor and extending over the entire area of said floor, said metal grid being adapted to catch sparks which would otherwise fall on said floor, an opening on one side of said barbecue device located above said grid, an external fire pit located adjacent said opening and outside the barbecue device, the floor of said fire pit being located below the bottom of said opening.

References Cited in the file of this patent

UNITED STATES PATENTS

| Number | Name | Date |
|---|---|---|
| 860,466 | Hatcher | July 16, 1907 |
| 1,145,691 | Lajcak | July 6, 1915 |
| 1,595,846 | Wood | Aug. 10, 1926 |
| 2,143,999 | Rosson | Jan. 17, 1939 |
| 2,314,627 | Millikan | Mar. 23, 1943 |
| 2,349,617 | Gorman | May 23, 1944 |
| 2,361,247 | Swenson | Oct. 24, 1944 |
| 2,520,578 | Treloar | Aug. 29, 1950 |